United States Patent [19]

Kershner

[11] Patent Number: 4,849,242

[45] Date of Patent: Jul. 18, 1989

[54] METHOD FOR REDUCING THE AVAILABLE CALORIES IN A FOOD COMPOSITION

[75] Inventor: Larry D. Kershner, Midland, Mich.

[73] Assignee: The Dow Chemical Company, Midland, Mich.

[21] Appl. No.: 846,526

[22] Filed: Mar. 31, 1986

[51] Int. Cl.$^4$ .............................................. A23D 5/00
[52] U.S. Cl. .................................. 426/601; 426/611; 426/612; 426/804
[58] Field of Search ................ 426/611, 612, 606, 804

[56] References Cited

U.S. PATENT DOCUMENTS

| | | | |
|---|---|---|---|
| 2,610,125 | 9/1952 | Valko | 426/611 |
| 3,185,575 | 5/1965 | Geisler | 426/611 |
| 3,751,265 | 8/1973 | Seiden | 426/611 |
| 4,137,338 | 1/1979 | Gawrilow | 426/606 X |
| 4,456,626 | 6/1984 | Nelson et al. | 426/606 X |
| 4,508,746 | 4/1985 | Hamm | 426/611 X |

Primary Examiner—Donald E. Czaja
Assistant Examiner—Celine T. Callahan

[57] ABSTRACT

Reduced calorie food compositions are produced by replacing at least a portion of the fat content of a conventional food with an improved low calorie edible oil substitute that does not cause anal leakage. This substitute is an oil-like polymer fatty acid ester having the property of being substantially hydrolyzed during the process of intestinal digestion into a mixture of fatty acids and a non-caloric water-soluble or water-dispersible polymeric alcohol. This digestive mixture is in a non-laxative, non-oily physical state, and thereby avoids the problem of anal leakage common to oils with limited digestibility. Of particular use in this invention have been fatty acid esters of water-soluble polyoxyalkylenes.

17 Claims, No Drawings

METHOD FOR REDUCING THE AVAILABLE CALORIES IN A FOOD COMPOSITION

BACKGROUND OF THE INVENTION

This invention relates to food compositions containing low calorie edible oil substitutes.

In recent years the associated health problems of arteriosclerosis and obesity have raised much concern about the high fat content of the average American diet. The typical edible fats and fatty oils found in the diet are made up predominantly of triesters of glycerol with fatty acids and are known as triglycerides. Customarily triglycerides that are solid at ambient temperatures are called fats, while those that are liquid are known as oils.

As a result of these health concerns, an increasingly calorie-conscious public has shown great interest in "diet", "lite", and "low calorie" formulations of highly caloric, edible fat-containing food compositions. Examples of these foods include cakes, ice cream, confectionery, salad oil, mayonnaise, margarine, potato chips, snack foods, and prepared culinary mixes (for cakes, icings and the like). Many of the diet formulations of these foods are based on dilution with air or water, with a corresponding reduction in the perceived quality of the food. A more attractive alternative is to reduce the fat-related caloric intake by a modification of the fat so as to reduce or prevent the absorption of fat-derived calories.

According to Mattson and Nolen (J. Nutr., 102, p. 1171, 1972) "the absorbability of a fat is determined by two processes, hydrolysis in the lumen of the intestinal tract and the subsequent absorption of the digestion products." One approach to this problem would be to re-engineer conventional fats so as to reduce their susceptibility to intestinal hydrolysis. Without this hydrolysis the fat would not be in the form required for intestinal absorption and would simply pass through the body unchanged. If nothing were absorbed, the material would be non-caloric. Such an approach is taught by Mattson and Volpenhein in U.S. Pat. No. 3,600,186, which shows the use of sugar fatty acid esters having at least four fatty acid ester groups. These esters are said to have the physical properties of ordinary triglyceride fats, but are not absorbed to the same extent owing to a low rate of hydrolysis by intestinal lipase enzymes.

A similar approach is taught by Hamm in U.S. Pat. No. 4,508,746. In this case tricarballyic acid esters of long-chain alcohols are used as low-calorie edible oil substitutes. These esters are also poorly absorbed owing to a low rate of hydrolysis in the intestine during digestion.

Both of these compounds are reported to have satisfactory organoleptic properties for use in food formulation and preparation. Unfortunately, ingestion of significant amounts of either compound can result in an undesired "laxative" effect, namely, leakage of the liquid material through the anal sphincter (D. J. Hamm, J. Food Science, 49, p. 419, 1984). This "anal leakage" problem seems to be the inevitable result of the ingestion of an oily material with limited digestibility.

What is needed is a low calorie, edible oil substitute that has the properties of a triglyceride oil when ingested, but that is altered by the gastrointestinal tract to a non-oily physical state so as to avoid anal leakage.

SUMMARY OF THE INVENTION

This invention is a method for reducing the available calories in a food composition having an edible oil component, which method comprises replacing an effective portion of the edible oil in such food composition with an oil-like polymer fatty acid ester. This polymer fatty acid ester has the property of being substantially hydrolyzed after ingestion by intestinal digestion into a mixture comprising fatty acids and an essentially non-caloric, water-soluble or water-dispersible polymeric alcohol. This digestive mixture is in a non-laxative, non-oily physical state, and thereby avoids the problem of anal leakage common to oils with limited digestibility. The polymeric alcohol portion of the ester is non-caloric because it is essentially not absorbed by the intestine. Since a portion of the polymer fatty acid ester is non-caloric, the ester as a whole has reduced caloric availability as compared to a triglyceride oil. The amount of polymer fatty acid ester in the food is an amount sufficient to reduce the caloric availability of the food.

In another aspect, this invention is a food composition having an edible oil component with reduced caloric availability in which the edible oil component comprises an amount of said oil-like polymer fatty acid ester effective to reduce the caloric content of the food.

As used herein, the terms "oil-like" and "having oil-like properties" mean that the material is lipophilic and exhibits those physical and functional properties of a normal triglyceride oil or fat necessary for use in or preparation of a fat containing food composition, and that the material can function as a partial or total substitute for the triglyceride oil in such food compositions. Such physical and functional properties include a melting point of about the normal body temperature of 37° C. or less, to avoid a waxy mouth feel. The material should also be tasteless and have good lubricity with a clean and light mouth feel. If the oil is to be used for cooking or frying, then it must have high thermal stability and be capable of tolerating temperatures from 160° to 200° C. for extended time periods. Such frying oils typically dissolve no more than 0.15 g of water per 100 g of oil, with a correspondingly low solubility of the oil in water. Other food compositions such as salad oil or mayonnaise do not require the properties of thermal stability and low water solubility. In certain of these cases it can be advantageous for the oil to exhibit a degree of miscibility with water as an aid to formulation.

The term "non-caloric" means that the material has no significant caloric availability to the body due to a very low rate of intestinal absorption. Typically, such a rate is less than 20 percent, preferably less than 10 percent and more preferably less than 5 percent.

DETAILED DESCRIPTION OF THE INVENTION

The polymer fatty acid ester employed in this invention is derived from a polymeric alcohol and fatty acids.

This polymeric alcohol has one or more hydroxyl group and is sufficiently water-soluble or water-dispersible to allow it to pass through the body in the aqueous phase. The polymer fatty acid ester is formed by the esterification of a sufficient number of these hydroxyl groups with fatty acids to effect a change in physical state from a water-soluble to an oil-like material. If the polymeric alcohol has too high a degree of water-solubility (i.e., a large number of hydroxyl groups) it will be difficult for the esterification to effect this physical change. This polymeric alcohol is further characterized as being essentially non-caloric.

In a particularly preferred embodiment of this invention, the polymeric alcohol is a polyoxyalkylene. The physical properties of polyoxyalkylenes such as melting point and water-solubility can be easily varied by changing molecular weight and glycol type. For example, polyoxyethylenes are generally water-soluble solids, and by increasing the molecular weight, the hydrophilicity and melting point increase. Polyoxypropylenes are generally water-insoluble liquids, and by increasing the molecular weight, the hydrophilicity decreases. Polyoxybutylenes are more hydrophobic than polyoxypropylenes, with the hydrophilicity again decreasing with increasing molecular weight. Block and random copolymers of these components can be used to fine tune these physical properties. Preferred polyoxyalkylenes are derived from ethylene oxide, propylene oxide, butylene oxide, and mixtures thereof.

Polyoxyalkylenes useful in this invention have a sufficient molecular weight to essentially prevent intestinal absorption; i.e., to be non-caloric. Also, preferably the molecular weight is sufficiently low so that the resulting polymer fatty acid ester exhibits a melting point of about the normal body temperature of 37° C. Fats with melting points above this temperature do not melt in the mouth and may be perceived as "waxy", with unacceptable organoleptic properties. Preferred polyoxyakylenes have a number-average molecular weight ($\overline{M}_n$) from about 800 to about 4,000, more preferably from about 1,400 to about 1,800.

The polyoxyalkylene employed in the preferred embodiment of this invention has a degree of functionality, i.e., number of hydroxyl groups; sufficient to achieve the desired level of water-solubility or water-dispersibility. This degree of functionality can be controlled by the choice of the initiator for the polymer, and in turn governs the number of sites for possible esterification of the polymer. Suitable initiators include, but are not limited to: water, alkylene glycol, glycerol, polyglycerols, sugar alcohols, sugar alcohol anhydrides, monosaccharides, disaccharides, and polycarboxylic acids. Large functionalities are undesirable because, assuming full esterification, they lead to polymer fatty acid esters in which a relatively large portion of the ester is highly caloric fatty acid, thereby increasing the caloric content of the ester. The preferred initiator is water, giving a difunctional polyoxyalkylene having two hydroxyl groups.

One or more of the hydroxyl groups of the polyoxyalkylene can be derived as ethers, if desired, provided that the resulting ether retains sufficient hydroxyl groups to remain water-soluble or water-dispersible. Such ether derivatives are not affected by the digestive process and remain on the polyoxyalkylene after any fatty acids present are removed by intestinal hydrolysis. This ether derivative can be used to reduce the water-solubility of a highly water-soluble multi-functional polyoxyalkylene so that a minimum of caloric fatty acid groups are required to effect a change to an oil-like state. Examples of this include a mono-stearyl ether of a polyalkylene glycol, or a mono or di-stearyl ether of a trifunctional polyoxyalkylene derived from glycerine.

Suitable polymeric alcohols for use in this invention include: a mono-stearyl ether of a difunctional polyoxyethylene with a number-average molecular weight ($\overline{M}_n$) of 880 for the oxyalkylene portion; a glycerine initiated trifunctional polyoxyalkylene random copolymer composed of 55 percent oxyethylene and 45 percent oxypropylene with a number-average molecular weight ($\overline{M}_n$) of 2,600; a difunctional polyoxyalkylene random copolymer composed of 40 percent oxyethylene and 60 percent oxypropylene having a number-average molecular weight ($\overline{M}_n$) of 1,670. In the most preferred embodiment of this invention, the polymeric alcohol is a difunctional polyoxyalkylene random copolymer composed of 40 percent oxyethylene and 60 percent oxypropylene having a number-average molecular weight ($\overline{M}_n$) of 1,670 and a narrow molecular weight distribution with a weight-average to number-average molecular weight ratio ($\overline{M}_w/\overline{M}_n$) of 1.05.

The fatty acids employed in this invention are any saturated or unsaturated, naturally occurring or synthetic fatty acids having the chain length and hydrophobic nature necessary to change the polymeric alcohol to a compound having a lipophilic character after esterification. Such acids generally have from 12 to 22 carbon atoms and include such examples as lauric, myristic, palmitic, stearic, oleic, linoleic, linolenic, and behenic acid. Fatty acids with fewer than 12 carbon atoms are not generally hydrophobic enough to effect this change in the polymeric alcohol to an oil-like material; those with more than 22 carbon atoms are not readily available commercially. Especially preferred examples are stearic and oleic acid, with stearic acid being most preferred.

The polymer fatty acid esters employed in the preferred embodiment of this invention are fatty acid esters of polyoxyalkylenes. The methods for preparing such esters are known and many have been disclosed in W. B. Satkowski et al., "Polyoxyethylene Esters of Fatty Acids" in *Nonionic Surfactants;* M. J. Schick, Ed.; Dekker; New York; pp. 142-174. A sample of such material in a form suitable for the practice of the present invention can be prepared by a transesterification of polyoxyalkylene with a suitable fatty acid ester in an appropriate solvent containing a basic catalyst. Examples of a suitable fatty acid ester, solvent, and basic catalyst would include methyl stearate, toluene, and sodium methoxide, respectively. The presence of a small amount of unreacted or only partially derived polyoxyalkylene will have no deleterious effect on the properties of the material.

In particular, a sample of polymer fatty acid ester suitable for use in the present invention may be prepared as follows: methyl stearate (0.713 mol), toluene (550 ml), and polyoxyalkylene (0.375 mol of a difunctional random copolymer composed of 40 percent oxyethylene and 60 percent oxypropylene having a number-average molecular weight of 1,670) are combined and any residual water is removed azeotropically by distillation of 90 ml of toluene over one hour. After cooling, toluene (120 ml) and sodium methoxide (0.0375 mol; 25 weight percent in MeOH) are added and the mixture is heated to 120° C. Over a period of 5 hours, 550 ml of distillate (toluene and methanol) is collected, during which time fresh toluene is periodically added to the mixture. At this point a second portion of sodium methoxide (0.0375 mol; 25 weight percent in MeOH) is added and an additional 650 ml of distillate is collected over 14 hours with periodic addition of fresh toluene.

After cooling, stearoyl chloride (0.075 mol) is added and the mixture is warmed to 50° C. for 1 hour, and then is stirred overnight at room temperature. At this point the mixture is filtered, then eluted slowly through a column of over-dried weakly basic ion exchange beads. The resulting solution is concentrated under vacuum, then stirred with water (10 ml). Water and residual solvent are finally removed from the product by a wiped film distillation. The conversion of polyoxyalkylene to distearate ester is shown chromatographically to be 90 percent complete.

The most preferred polymer fatty acid esters employed in this invention are those in which all of the hydroxyls have been esterified with fatty acids. Preferable polymer fatty acid esters will also have melting points below the normal body temperature of 37° C.

Suitable polymer fatty acid esters for use in this invention include: a mono-stearate ester, mono-stearyl ether of a difunctional polyoxyethylene with a number-average molecular weight ($\overline{M}_n$) of 880 for the oxyalkylene portion; a tri-stearate ester of a glycerine initiated trifunctional polyoxyalkylene random copolymer composed of 55 percent oxyethylene and 45 percent oxypropylene with a number-average molecular weight ($\overline{M}_n$) of 2,600 for the oxyalkylene portion; a di-stearate ester of a difunctional polyoxyalkylene random copolymer composed of 40 percent oxyethylene and 60 percent oxypropylene having a number-average molecular weight ($\overline{M}_n$) of 1,670 for the oxyalkylene portion. In the most preferred embodiment of this invention, the polymer fatty acid ester is a di-stearate ester of a difunctional polyoxyalkylene random copolymer; the polymer being composed of 40 percent oxyethylene and 60 percent oxypropylene and having a number-average molecular weight ($\overline{M}_n$) of 1,670, with a narrow molecular weight distribution and a weight-average to number-average molecular weight ratio ($\overline{M}_w/\overline{M}_n$) of 1.05.

The polymer fatty acid esters employed in this invention have reduced caloric availability compared with normal triglyceride oils by virtue of the non-caloric nature of the polymer portion of the esters. In a preferred embodiment of the invention, the polymeric alcohol comprises at least one-half of the ester by weight, resulting in a caloric availability of only one-half that of an equal weight of triglyceride oil. In a more preferred embodiment, the polymeric alcohol comprises at least two-thirds of the ester, with a caloric availability of only one-third that of an equal weight of a triglyceride oil.

The polymer fatty acid ester employed in the present invention is used as a partial or total replacement for a normal triglyceride oil or fat in any edible fat-containing food composition, and is employed in an amount sufficient to reduce the available calories. The polymer fatty acid ester can replace a triglyceride, for example, in a cooking oil, frying oil, salad oil, or as a shortening. Additional uses include combination with other ingredients to form food compositions such as cakes, ice cream, confectionery, mayonnaise, margarine, potato chips, snack foods, and prepared culinary mixes. Typically from about 10 percent to 100 percent of the triglyceride oil in a food composition can be replaced with polymer fatty acid ester. The amount of polymer fatty acid ester used is preferably enough to provide a total reduction in available calories of at least 10 percent, more preferably at least 25 percent, and most preferably at least 33 percent.

The polymer fatty acid esters employed in this invention have the property of being substantially hydrolyzed after ingestion by intestinal digestion into mixtures comprising fatty acids and essentially non-caloric water-soluble or water-dispersible polymeric alcohols. This digestive mixture is in a non-laxative, non-oily physical state, and thereby avoids the problem of anal leakage common to oils with limited digestibility. This sensitivity towards enzymatic hydrolysis of the polymer fatty acid esters can be demonstrated by an in-vitro enzyme digestion experiment similar to that developed by Mattson and Nolen (*J. Nutr.*, 102, p 1171, 1972). The results of such an experiment show that polymer fatty acid esters such as polyoxyethyleneoxypropylene 1,670 di-stearate undergo reasonably rapid enzymatic hydrolysis, comparable to that seen for a normal triglyceride oil.

Other features, advantages and specific embodiments of this invention will become readily apparent to those with skill in the art. In addition, while specific embodiments of this invention have been described in detail, variations and modifications of these embodiments can be effected without departing from the spirit and scope of this invention as disclosed and claimed.

What is claimed is:

1. A method for reducing the available calories in a food composition having an edible oil component, which method comprises replacing from 10 to 100 percent of the edible oil in such food composition with a fatty acid ester of a polyoxyalkylene having the property of being substantially hydrolyzed after ingestion by intestinal digestion into a mixture comprising fatty acids and an essentially non-caloric water-soluble or water-dispersible polyoxyalkylene.

2. The method of claim 1, wherein the polyoxyalkylene is formally derived by interaction of any suitable initiator with members of the group consisting of ethylene oxide, propylene oxide, butylene oxide, and mixtures thereof.

3. The method of claim 2, wherein the polyoxyalkylene has a sufficient molecular weight to essentially prevent intestinal absorption.

4. The method of claim 3, wherein the polyoxyalkylene has a number-average molecular weight ($\overline{M}_n$) from about 800 to about 4,000.

5. The method of claim 4, wherein the polyoxyalkylene has a number-average molecular weight ($\overline{M}_n$) from about 1,400 to about 1,800.

6. The method of claim 5, wherein the polyoxyalkylene is a random difunctional copolymer composed of 40 percent oxyethylene and 60 percent oxypropylene having a number-average molecular weight ($\overline{M}_n$) of 1,670 and a narrow molecular weight distribution with a weight-average to number-average molecular weight ratio ($\overline{M}_w/\overline{M}_n$) of 1.05.

7. The method of claim 3, wherein one or more of the hydroxyl groups of said polyoxyalkylene are derived as ethers, the resulting ethers retaining sufficient free hydroxyl groups to remain water-soluble or water-dispersible.

8. The method of claim 1, wherein the fatty acids are any saturated or unsaturated, naturally occurring or synthetic fatty acids having sufficient lipophilic character to effect a change in said polymeric alcohol to an oil-like physical state after esterification.

9. The method of claim 8, wherein the fatty acids have from about 12 to about 22 carbon atoms.

10. The method of claim 9, wherein the fatty acids are either stearic or oleic acid.

11. The method of claim 10, wherein the polymer fatty acid ester is a di-stearate ester of a difunctional polyoxyalkylene random copolymer, said copolymer being composed of 40 percent oxyethylene and 60 percent oxypropylene having a number-average molecular weight ($\overline{M}_n$) of 1,670 and a narrow molecular weight distribution with a weight-average to number-average molecular weight ratio ($\overline{m}_w/\overline{m}_n$) of 1.05.

12. The method of claim 1, wherein the polymeric alcohol comprises at least one-half of the polymeric fatty acid ester by weight.

13. The method of claim 12, wherein the polymeric alcohol comprises at least two-thirds of the polymeric fatty acid ester by weight.

14. The method of claim 1, wherein the polymer fatty acid ester has all of the available hydroxyl groups esterified with fatty acids.

15. The method of claim 1, wherein sufficient edible oil is replaced with polymer fatty acid ester to provide a total reduction in available calories in the food composition of at least 10 percent.

16. The method of claim 15, wherein sufficient edible oil is replaced with polymer fatty acid ester to provide a total reduction in available calories in the food composition of at least 25 percent.

17. The method of claim 16, wherein sufficient edible oil is replaced with polymer fatty acid ester to provide a total reduction in available calories in the food composition of at least 33 percent.

* * * * *